Aug. 17, 1965  J. F. GILLMORE ETAL  3,200,847
HIGH PRESSURE VALVE ASSEMBLY
Filed May 23, 1962

INVENTORS
JACK F. GILLMORE &
BY WILLIAM E. ELDER
Oberlin, Maky & Donnelly
ATTORNEYS 3,200,847
HIGH PRESSURE VALVE ASSEMBLY
Jack F. Gillmore, Van Nuys, and William E. Elder, Playa Del Rey, Calif., assignors to Parker-Hannifin Corporation, Cleveland, Ohio, a corporation of Ohio
Filed May 23, 1962, Ser. No. 196,973
6 Claims. (Cl. 137—625.65)

The present invention relates generally as indicated to a high pressure valve assembly.

Hitherto, high pressure valve assemblies have comprised valve housings of strong, heavy and expensive structure so that the ports and passages therein are capable of withstanding extremely high fluid pressures to which such valve assemblies are subjected. Moreover, in the case of high pressure solenoid operated valves such strong housings become all the more heavier in weight and more expensive to manufacture owing to the necessity of providing bosses for mounting of the solenoid housings and electrical coupling units.

Accordingly, it is one principal object of the present invention to provide a high pressure valve assembly which has a two-part housing of which one part is of lightweight, inexpensive form (such as a die casting) having, in the case of a solenoid operated valve assembly, provision for mounting of the solenoids and electrical couplings, and having passages for the solenoid wiring and for low pressure fluid; and of which the other part is small and compact, but fabricated of high strength material, and having therein the high pressure ports and passages.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

Figure 1:
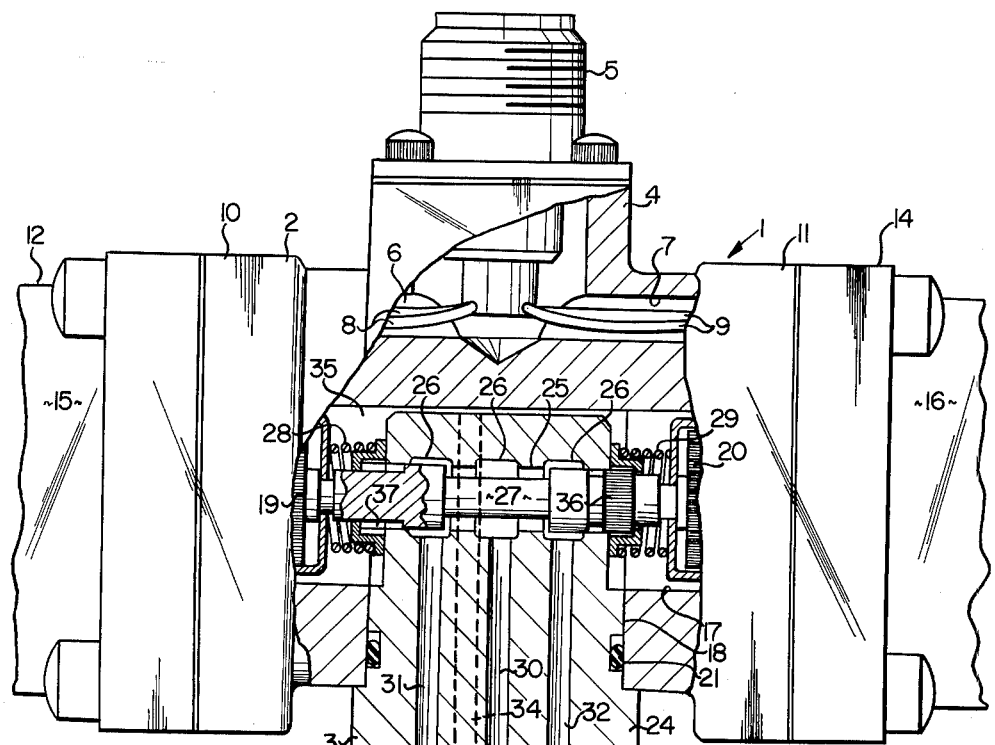
Figure 2:
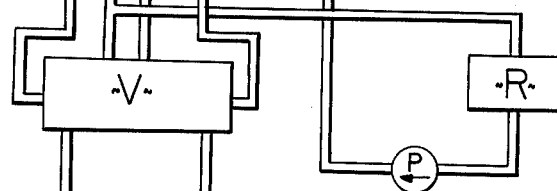
Figure 2:
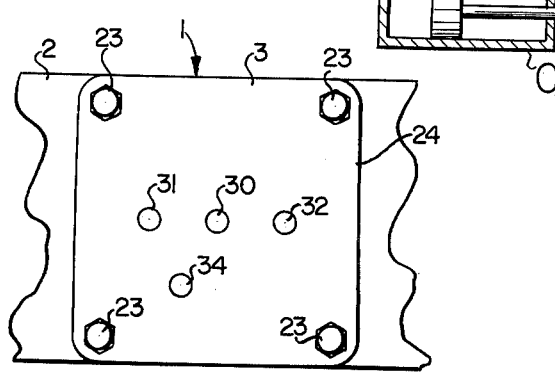

In said annexed drawing:

FIG. 1 is a fragmentary cross-section view of a high pressure valve assembly according to the present invention; and FIG. 2 is a bottom plan view of the central portion of the FIG. 1 valve assembly.

Referring now to the drawing, the high pressure valve assembly 1 herein comprises a two-part housing including a large lightweight and inexpensive housing part 2, a die casting of lightweight metal alloy, for example, and a small and strong housing part 3 as of alloy steel, or the like.

The housing part 2 being die cast as it is, already has, when made, a boss 4 for mounting of an electrical connector 5, passages 6 and 7 for electrical leads 8 and 9, and bosses 10 and 11 at opposite ends for mounting of solenoid assemblies 12 and 14, the housings 15 and 16 of which also may be fabricated by die casting from lightweight metal. The die cast housing part 2 also may be formed as die cast with intersecting passages 17 and 18 for the solenoid armatures 19 and 20 and for the other housing part 3, respectively.

The small and strong housing part 3 is of cylinder form and extends into the passage 18 and is sealed therein as by means of the O-ring 21, the housing parts 2 and 3 being secured together as by means of screws 23 extending through the flange 24 of said housing part 3 and having threaded engagement with holes in the die cast housing part 2.

Adjacent its upper end, the housing part 3 is provided with a through bore 25 which is coaxial with the passage 17 of the housing part 2, such through bore 25 being formed with annular recesses 26. Slidable in said through bore 25 is a spool valve member 27 which, at its opposite ends, is connected with the respective solenoid armatures 19 and 20. When both solenoids 12 and 14 are de-energized, the springs 28 and 29 are effective to hold the spool valve member 27 in neutral position, as shown, whereby high fluid pressure in the pressure inlet passage 30 is communicated with both of the service or motor passages 31 and 32. The housing part 3 furthermore is provided with a low pressure passage 34 which leads to the chamber 35 between the housing parts 2 and 3.

By way of example, the pressure inlet passage 30 is shown as being in fluid communication with the high pressure delivery port of the hydraulic pump P which, for example, may have a delivery pressure of 5,000 p.s.i. or more; the passages 31 and 32 are shown as leading into the opposite ends of a main four-way cylinder control valve V for shifting the movable valve member therein, not shown, in either direction; and the low pressure passage 34 is communicated with the return circuit leading to a fluid reservoir R. Operatively connected with the main four-way cylinder control valve V is a double-acting hydraulic cylinder C and it can be seen that when the main control valve V is in neutral position the fluid delivered by the pump P flows through the control valve V to the reservoir R, and when the valve member therein is shifted in one direction or the other, the piston in the cylinder C is caused to move in either direction with the displaced fluid being returned through the main control valve V to the reservoir R. This illustration is, of course, merely exemplary and, if desired, the housing part 3 and spool valve member 27 therein may be arranged for direct connection with a fluid motor for actuating the latter.

In any event, in the example given, when the left solenoid 12 is energized its armature 19 will pull the valve spool 27 toward the left, whereby the high pressure inlet passage 30 is communicated with the left supply passage 31 to actuate the main control valve V and, in turn, the cylinder C connected therewith. In this position of the spool valve member 27 displaced fluid flows through the other supply passage 32 and through the serrations 36 at the right end of the spool valve member 27 into the chamber 35 and thence from the chamber 35 through the low pressure passage 34 to the reservoir R.

Conversely, when the right-hand solenoid 14 is energized its armature 20 will pull the spool valve member 27 to the right to open communication between the high pressure inlet passage 30 and the supply passage 32 and displaced fluid flows to the reservoir R via the other supply passage 31, the serrations 37 at the left end of the spool valve member 27, the chamber 35, and the low pressure passage 34.

From the foregoing, it is clear that the high pressure fluid in housing part 3 does not have access to any part of the die cast housing part 2 since the chamber 35 defined between the housing parts 2 and 3 has fluid communication only with the low pressure passage 34 and reservoir R circuit, while the high pressure fluid delivered to inlet passage 30 can only flow through the passages 31 and 32 formed in the housing part 3, the latter being relatively small, simple, inexpensive, and strong, by reason of its being made as from an alloy steel forging, alloy steel bar stock, or the like.

Other modes of applying the principle of the invention may be employed, change being made as regards the details described, provided the features stated in any of the following claims, or the equivalent of such, be employed.

We therefore particularly point out and distinctly claim as our invention:

1. A high pressure valve assembly comprising a first high pressure housing part having high pressure inlet and outlet passages for communication with a fluid pressure source and a fluid pressure actuated unit respectively, and a low pressure passage extending through said high pressure housing part for communication with a fluid reservoir; a second low pressure housing part to which said housing part is secured to define a low pressure space to which said low pressure passage leads; and a valve means in said first housing part movable therein selectively to establish fluid communication between an outlet passage and either said high pressure inlet passage or said space, said valve means being operative in all positions to isolate said high pressure inlet passage from said space.

2. The valve assembly of claim 1 wherein said second housing part is of a material the strength and weight of which are substantially less than the strength and weight of said first housing part.

3. The valve assembly of claim 1 wherein said first housing part has a single high pressure inlet passage and a pair of high pressure outlet passages; and wherein said valve member is of four-way type to communicate either outlet passage with said inlet passage and the other outlet passage with said space when moved to different positions in said first housing part.

4. The valve assembly of claim 1 wherein said second housing part has a cavity extending through the wall thereof for receiving said first housing part therein, and a bore intersecting said cavity; and wherein valve member actuating means extend into such bore.

5. A high pressure valve assembly comprising a high pressure cylindrical housing part having a bore diametrically thereacross adjacent one end, high pressure inlet and outlet passages intersecting said bore at axially spaced zones and extending through the other end, and a low pressure passage extending from end to end of said part clear of said high pressure passages and said bore; a pressure cast metal housing part of less strength and weight than said cylindrical housing part having a cavity to receive such one end of said cylindrical housing part therein and defining a space therewith to which said low pressure passage leads; said second named part receiving such one end of the first named part through the wall of the second named part; and a spool valve means reciprocable in said bore to selectively establish fluid communication between one outlet passage and either said inlet passage or said space via an end of said bore, said spool valve means being operative in all positions to maintain said high pressure inlet passage isolated from said space.

6. The valve assembly of claim 5 wherein said pressure cast housing has a solenoid coil mounted thereon; and wherein said coil has an armature operatively connected with said spool valve member to move the latter when said coil is energized.

References Cited by the Examiner
UNITED STATES PATENTS

| | | | |
|---|---|---|---|
| 2,410,404 | 11/46 | Buchanan | 137—625.67 |
| 2,591,800 | 4/52 | Gardiner | 137—625.64 XR |
| 2,600,746 | 6/52 | Ernst | 137—625.65 |
| 2,630,136 | 3/53 | Brandes et al. | 137—625.65 |
| 2,782,863 | 2/57 | Christy et al. | 137—625.65 XR |
| 2,916,019 | 12/59 | Murphy | 137—625.65 |
| 2,924,240 | 2/60 | Dolan | 137—596.12 XR |
| 2,966,890 | 1/61 | Panissidi | 137—625.64 |

FOREIGN PATENTS

| | | |
|---|---|---|
| 549,385 | 10/56 | Italy. |

M. CARY NELSON, *Primary Examiner.*

MILTON KAUFMAN, MARTIN P. SCHWADRON,
*Examiners.*